United States Patent [19]
Tanaka

[11] 4,444,472
[45] Apr. 24, 1984

[54] LENS SYSTEM HAVING COLOR SEPARATION OPTICS

[75] Inventor: Kazuo Tanaka, Tokyo, Japan

[73] Assignee: Canon Kabushiki Kaisha, Tokyo, Japan

[21] Appl. No.: 175,523

[22] Filed: Aug. 5, 1980

[30] Foreign Application Priority Data

Aug. 8, 1979 [JP] Japan .................. 54-101115

[51] Int. Cl.³ .............. G02B 13/22; G02B 15/14; G02B 27/14
[52] U.S. Cl. .................... 350/423; 350/172; 350/173
[58] Field of Search ............ 350/423, 172, 173

[56] References Cited

U.S. PATENT DOCUMENTS

| 3,284,566 | 11/1966 | James et al. | 350/172 |
| 3,547,521 | 12/1970 | Ichizuka et al. | 250/423 |
| 3,945,034 | 3/1976 | Suzuki | 350/173 |
| 3,976,363 | 8/1976 | Toyama et al. | 350/173 |
| 4,058,827 | 11/1977 | Ando et al. | 350/173 |
| 4,249,805 | 2/1981 | Hilbert et al. | 350/415 |

Primary Examiner—John K. Corbin
Assistant Examiner—Rebecca D. Gass
Attorney, Agent, or Firm—Fitzpatrick, Cella, Harper & Scinto

[57] ABSTRACT

A lens system, particularly a zoom lens for color television camera is provided between the final face thereof and the image plane with a color separation optical system for example color separation prisms or a stripe filter, and is so constructed that the principal ray of each light beam entering said color separation optical system is always parallel to the optical axis, whereby all the beams are introduced into the color separation optical system under the same condition to maintain satisfactory color reproduction and polarizing characteristics.

4 Claims, 12 Drawing Figures

LENS SYSTEM HAVING COLOR SEPARATION OPTICS

BACKGROUND OF THE INVENTION

1. Field of the Invention

The present invention relates to a lens system particularly a zoom lens provided with a color separation system between the final face of the lens system and the image plane.

A lens system, particularly a zoom lens for a color television camera, is required to be satisfactory not only in imaging performance but also in color reproduction and in polarizing characteristics. However the multiple layers provided on the color separation prism positioned between the lens face and the image plane generally change spectral characteristics depending on the incident angle. The spectral characteristics are also known to be dependent on the polarized state of the incident light, eventually resulting in so-called shading phenomenon undesirably affecting the color reproduction. Also in a system provided with a stripe filter as the color separation system, such as in the two-tube television camera, the distance between the stripe filter and the image-taking plane causes a phase difference between the central area and the peripheral area, leading to a color aberration.

2. Description of the Prior Art

Means for avoiding such shading and polarization phenomena is disclosed in the Japanese Patent Publication No. Sho 53-42370, according to which the lens system behind the magnification varying system in the zoom lens is divided into a front group and a rear group with a color separation prism therebetween, and said rear group is designed with a positive refractive power whereby the inclination angle at said color separation prism of the peripheral ray defining the F-number of the lens is made smaller than the inclination angle at the final image plane to reduce said polarization and shading phenomena despite the use of the lens of a small F-number.

SUMMARY OF THE INVENTION

The object of the present invention is to provide a lens system, particularly a zoom lens system, in which the shading phenomenon and polarization phenomenon are satisfactorily corrected by a method different from that employed in the above-mentioned conventional system.

Another object of the present invention is to provide a lens system provided with a long back focus distance sufficient for providing a color separation system therein.

In the lens system of the present invention, the above-mentioned objects are achieved by providing a color separation optical system between the final face of the lens system and the image plane and constructing the lens system in such a manner that each principal ray of the beam emerging from the final face of said lens system becomes substantially parallel to the optical axis, whereby the principal ray of each beam enters the color separation system at substantially the same angle. Stated differently, in the present invention, the exit pupil of the lens system is placed at a position which can be regarded substantially infinite from the image plane thereby bringing the principal rays of various beams emerging from the exit pupil toward the image plane substantially in parallel state.

In the lens system of the present invention, the lenses positioned at the image field side of the diaphragm are composed of a negative lens group and a positive lens group arranged in this order from the object field side to particularly correct the polarization characteristics and the shading phenomenon. Such lens arrangement also has an effect of prolonging the back focus distance of the lens system. For the purpose of color correction, each lens group positioned at the image field side of the diaphragm is preferably provided with at least a combined lens composed of a concave lens and a convex lens.

DESCRIPTION OF THE PREFERRED EMBODIMENTS

Figure 1:
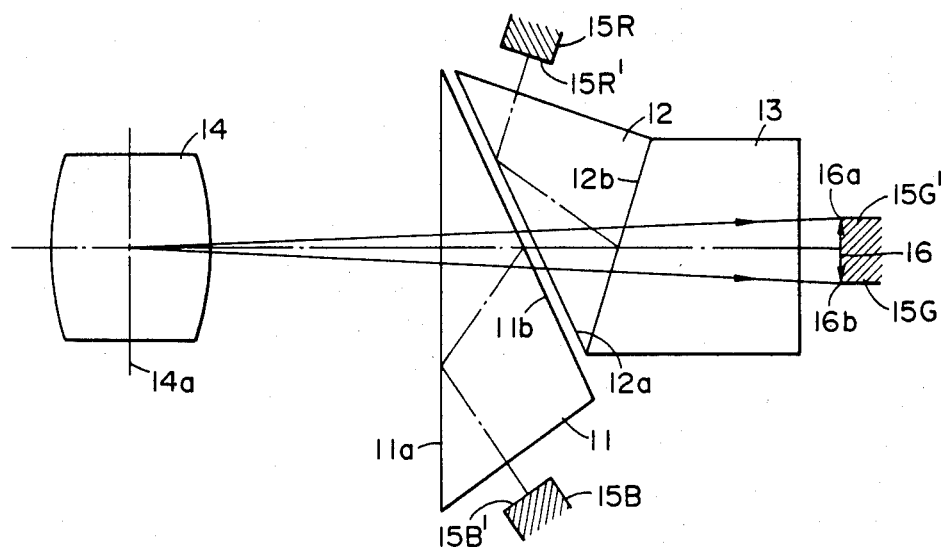
FIG. 1 is a view showing the relation between the color separation prism utilizing a dichroic layer and the light beam reaching the image plane of the lens system.

FIG. 1 shows the relationship between the position of the diaphragm in a lens system utilizing color separation prisms provided with dichroic layers and the light beams reaching the image plane, wherein there are shown glass blocks 11, 12, 13 provided on the interfaces 11b, 12b thereof with dichroic layers. The beam emerging from the center of the diaphragm 14a of the lens system enters the first prism 11 through an entrance face 11a, and, for example blue light alone is reflected by the face 11b provided with the dichroic layer, than totally reflected by the entrance face 11a and focused on the photoelectric face 15B' of an image-taking tube 15B. The beam transmitted by the dichroic layer 11b enters the second prism 12, and for example red light alone is reflected by the face 12b provided with the dichroic layer, then totally reflected by an interface 12a facing a parallel air gap provided between the first prism 11 and the second prism 12 and focused on the photoelectric face 15R' of another image-taking tube 15R. The beam, for example green light, transmitted by the dichroic layer 12b is focused through another prism 13 onto the photoelectric face 15G' of another image-taking tube 15G. In the following there will be considered, for example, the image 16 formed on said photoelectric face 15G'. Among the various principal rays passing through the center of the diaphragm 14a of the lens system 14, the principal ray proceeding toward the lower end 16b of the image 16 and that proceeding toward the upper end 16a have mutually different incident angles towards the dichroic layers (11b, 12b), whereby the lights received at said points are mutually different not only in the quantity thereof but also in the color characteristics.

In order to prevent this phenomenon, the principal rays emerging from the lens system should be parallel to the optical axis regardless of the image height. This condition should be achieved when the exit pupil of the lens system is positioned a substantially infinite distance from the image plane.

Figure 2:
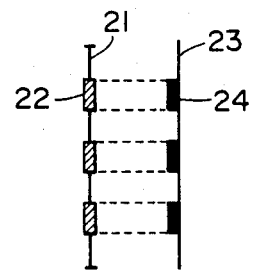
FIG. 2 is a view showing the relation between the stripe filter used as the color separation system and the photodetector element.

In the following I explain the case of utilizing a stripe filter as the color separation system. FIG. 2 shows the correspondence between the elements 22 of a stripe filter 21 and the elements 24 of a photodetector 23, and, unless the light emerging from the lens system enters the stripe filter 21 and the photodetector 23 substantially perpendicular thereto, said correspondence will be lost because of erroneous signal entry into said elements 24, resulting in a color exudation on the final image. Also in such a case the drawback can be prevented if the angle of the principal ray emerging from the lens system is maintained constant regardless of the image light, or if the exit pupil of the lens system is positioned a substantially distance infinite from the image plane.

Figure 3:
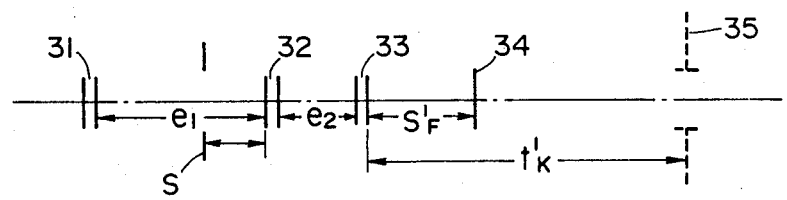
FIG. 3 is an explanatory view showing the composition of the lens system of the present invention.

Now there will be given a detailed explanation on the composition of the lens system of the present invention. The exit pupil of a lens system is determined by the lenses positioned at the image field side of the diaphragm. In case of a zoom lens, in order to prevent the change in the F-number associated with the zooming, the lens system is generally composed of a front lens group with a focusing unit, a zooming group, a diaphragm and a fixed relay lens group arranged in this order from the object field side. As shown in FIG. 3, the relay lens group is composed of two lens groups 32 and 33, and the symbols used therein have the following meanings:

f1: focal length of the lens group 31 at the object field side of the diaphragm S;
f2: focal length of the lens group 32;
f3: focal length of the lens group 33;
e1': distance between the principal points of the lens groups 31 and 32;
e2': distance between the principal points of the lens groups 32 and 33;
l: distance from the diaphragm to the front principal point of the first relay lens group 32 at the object field side;
f: focal length of the entire lens system;
S'F: back-focus distance or the distance from the rear principal point of the second relay lens group 33 at the image field side to the image plane 34;
t'k: distance from the rear principal point of the lens group 33 to the exit pupil 35.

The focal length f' of the entire lens system is given by:

$$f = \frac{e1 \cdot e2}{f1 \cdot f2 \cdot f3} - \frac{e1}{f1 \cdot f2} - \frac{e1}{f1 \cdot f3} - \frac{e2}{f2 \cdot f3} - \frac{e2}{f1 \cdot f3} +$$

$$\frac{1}{f1} + \frac{1}{f2} + \frac{1}{f3}$$

The back-focus distance S'F is given by:

$$S'F = \frac{e1 e2}{f1 f2} - \frac{e1}{f1} - \frac{e2}{f1} - \frac{e2}{f2} + 1$$

Also the distance to the exit pupil t'k is given by:

$$t'k = \frac{\left(-\frac{e2}{f2} + 1\right) \cdot l - e2}{\left(\frac{-e2}{f2 \cdot f3} + \frac{1}{f2} + \frac{1}{f3}\right) \cdot l + \left(-\frac{e2}{f3} + 1\right)}$$

In order that the distance to the exit pupil t'k becomes sufficiently large for a given focal length f1 of the lens group at the object field side of the diaphragm, the refractive powers of the lens groups 32, 33 located at the image field side of the diaphragm are given by the following equations:

$$\frac{1}{f2} = \frac{-\left(\left(\frac{e1}{f1} + 1\right) - \frac{l}{f1}\right)\left(1 - \frac{f}{f1}\right) f + S'F}{\left(-\frac{e1}{f1} + 1\right)\left\{-\left(-\frac{e1}{f1} + 1\right) + l \cdot S'F\right\} f^2 - S'F \cdot l}$$

$$\frac{1}{f3} = \frac{1 - \left(-\frac{e1}{f1 f2} + \frac{1}{f1} + \frac{1}{f2}\right) f}{S'F}$$

$$e2 = \frac{\left(-\frac{e1}{f1} + 1\right) f - S'F}{\left(-\frac{e2}{f1 \cdot f2} + \frac{1}{f1} + \frac{1}{f2}\right) f}$$

It is therefore rendered possible to obtain a lens system having a substantially infinitely distance exit pupil of the diaphragm by selecting the above-mentioned back-focus distance S'F in a range of 25 to 70 mm sufficient for placing the color separation system therein and determining the refractive powers of said lens groups 32, 33 according to the equations shown above.

In the lens system of the present invention, it is further desirable that the lens groups 32 and 33 arranged in this order in the image field side from the diaphragm are respectively provided with negative and positive refractive powers. Such arrangement of refractive powers not only reduces the shading and polarizing characteristics but also extends the back-focus distance of the lens system and places the exit pupil at a long distance.

It is further preferable that each of said lens groups 32, 33 is provided therein with at least an adhered lens composed of the combination of a concave lens and a convex lens for the purpose of sufficient chromatism correction.

Figure 4:
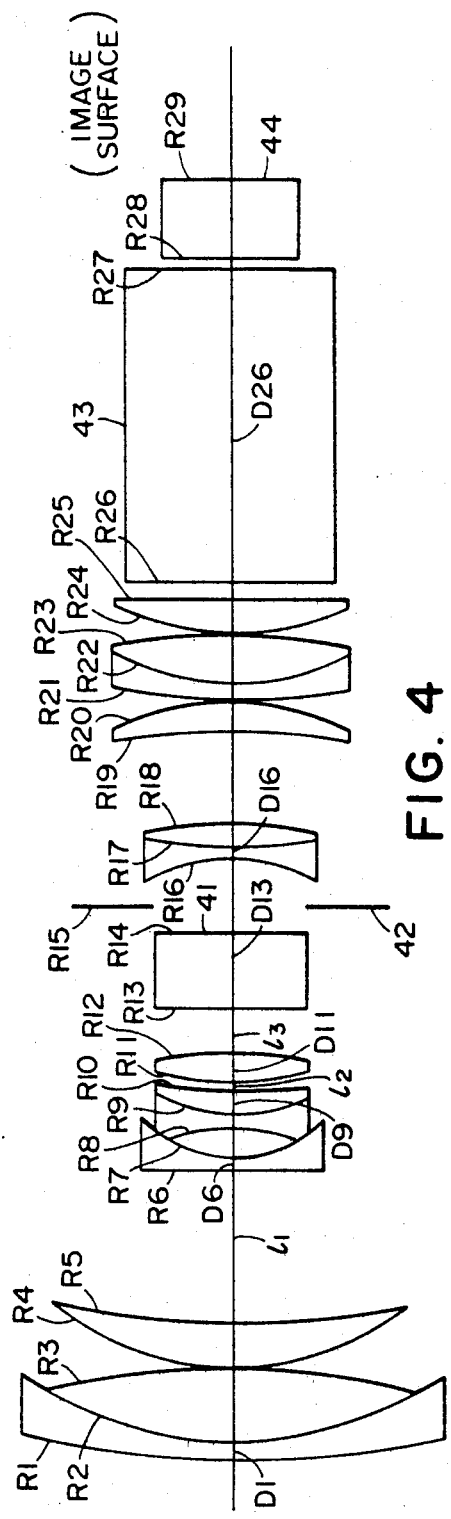
FIG. 4 is a view of an embodiment of the lens system of the present invention.
Figure 5A:
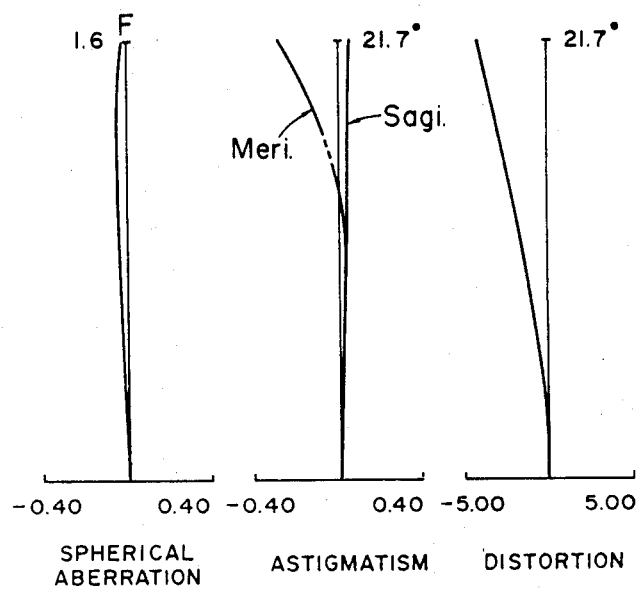
FIGS. 5A, 5B and 5C are charts of aberrations of the lens system shown in FIG. 4.
Figure 5B:
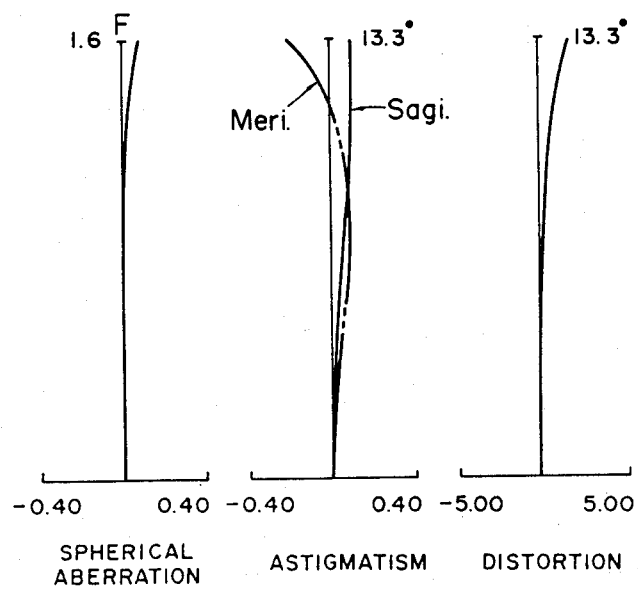
Figure 5C:
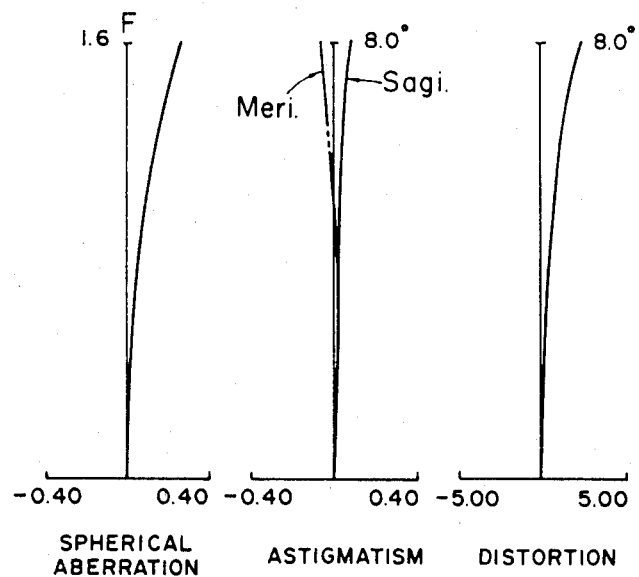

FIG. 4 shows in a cross-sectional view a zoom lens embodying the present invention, of which aberrations are represented in FIGS. 5A, 5B and 5C respectively at the shortest, medium and longest focal lengths. In the zoom lens shown in FIG. 4, the focusing lens group is composed of the 1st to 5th faces, the variable-magnification lens group is composed of the 6th to 12th lens faces, and the relay lens group is composed of the 16th to 25th lens faces. There are also shown a parallel-surfaced lens block for obtaining a finder light beam, a diaphragm 42, a color separation optical system 43, and a face plate 44 of the image-taking tube of which the 29th face constitutes the image plane of the lens system. The parameters of the lens system shown in FIG. 4 are summarized in Table 1, wherein:
Ri: radius of curvature of the i-th face;

Di: axial thickness of axial air gap between the i-th face and the (i+1)th face;

l1, l2, l3: axial air gaps variable for magnification change;

Vi: diffraction; and

Ni: refractive power.

TABLE 1

| Face | R | D | V | N |
|---|---|---|---|---|
| 1 | 103.69299 | 2.00 | 25.4 | 1.80518 |
| 2 | 36.80299 | 7.44 | 61.1 | 1.58913 |
| 3 | −90.86301 | 0.12 | | 1. |
| 4 | 27.11501 | 4.40 | 61.1 | 1.58913 |
| 5 | 96.97200 | $l_1$ | | 1. |
| 6 | −921.15894 | 0.90 | 58.2 | 1.62299 |
| 7 | 11.49700 | 3.38 | | 1. |
| 8 | −18.12801 | 0.90 | 64.1 | 1.51633 |
| 9 | 15.92100 | 2.63 | 25.4 | 1.80518 |
| 10 | 76.14600 | $l_2$ | | 1. |
| 11 | 34.96300 | 2.56 | 61.1 | 1.58913 |
| 12 | −69.15401 | $l_3$ | | 1. |
| 13 | 0.00000 | 7.50 | 64.1 | 1.51633 |
| 14 | 0.00000 | 2.50 | | 1. |
| 15 | 0.00000 | 4.71 | | 1. |
| 16 | −13.78925 | 1.20 | 54.7 | 1.72916 |
| 17 | 69.46980 | 2.00 | 27.5 | 1.75520 |
| 18 | −44.74146 | 9.20 | | 1. |
| 19 | −148.54586 | 3.50 | 60.7 | 1.60311 |
| 20 | −23.68433 | 0.20 | | 1. |
| 21 | 99.15430 | 1.20 | 23.9 | 1.84666 |
| 22 | 22.40880 | 5.00 | 62.3 | 1.61700 |
| 23 | −51.37389 | 0.20 | | 1. |
| 24 | 25.28543 | 3.00 | 63.1 | 1.56873 |
| 25 | 222.13584 | 2.00 | | 1. |
| 26 | 0.00000 | 32.00 | 44.7 | 1.68250 |
| 27 | 0.00000 | 1.00 | | 1. |
| 28 | 0.00000 | 8.25 | 64.1 | 1.51633 |
| 29 | 0.00000 | | | |
| Focal length | 13.813 | 23.329 | | 39.356 |
| $l_1$ | 1.7910 | 10.4620 | | 15.5990 |
| $l_2$ | 15.0560 | 9.9200 | | 1.2430 |
| $l_3$ | 4.7604 | 1.2352 | | 4.7604 |

The exit pupil is located at 284.5 meters in the image field side from the rear principal plane of the lens group composed of the 19th to 25th lens faces.

Figure 6:
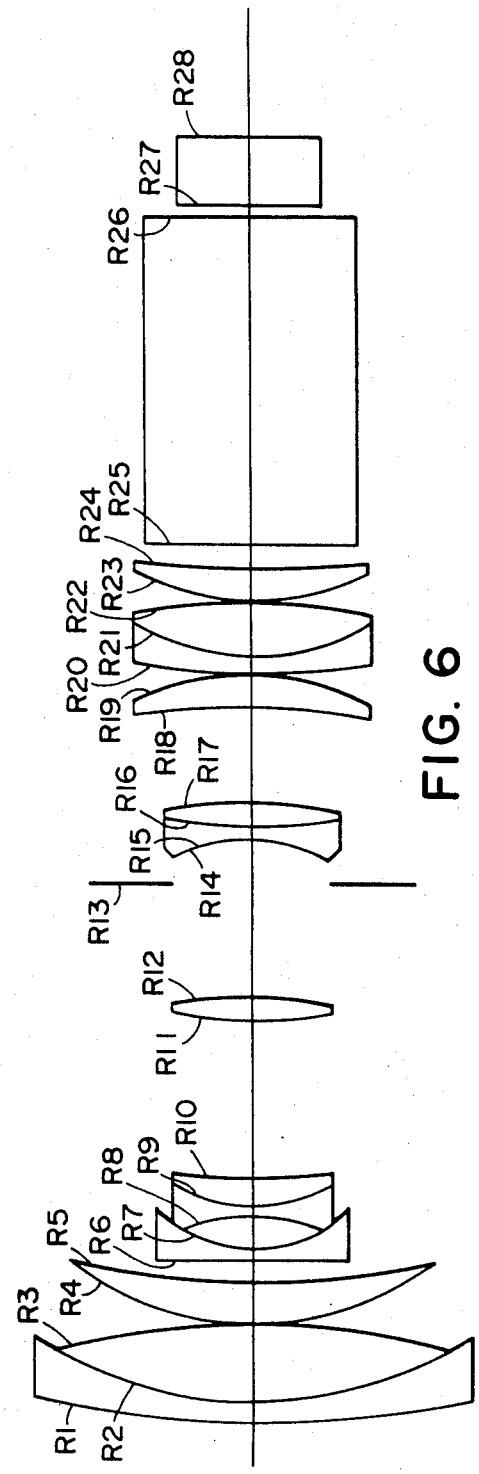
FIG. 6 is a view of another embodiment of the lens system of the present invention.
Figure 7A:
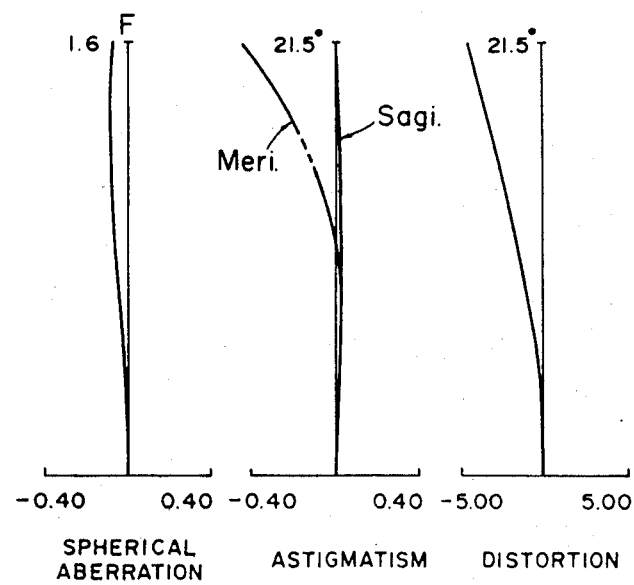
FIGS. 7A, 7B and 7C are charts of aberrations of the lens system shown in FIG. 6.
Figure 7B:
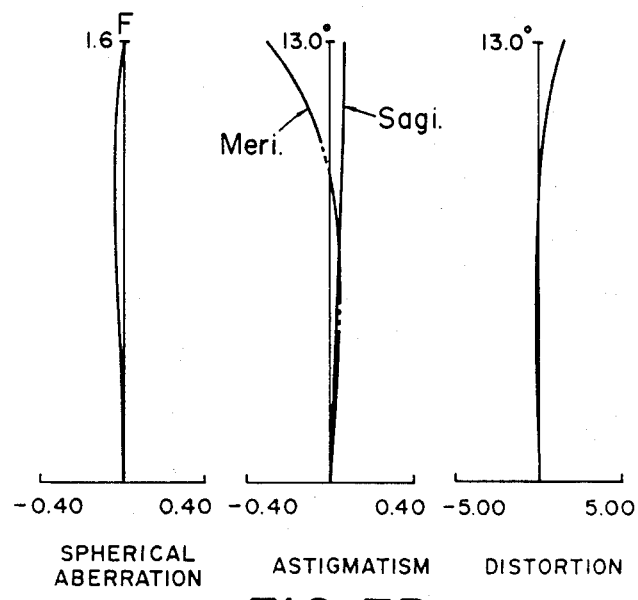
Figure 7C:
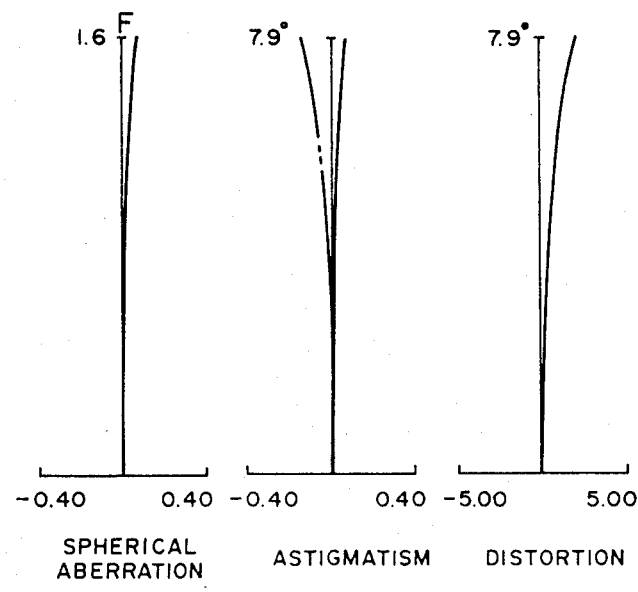
Figure 8:
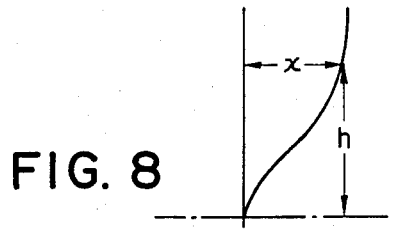
FIG. 8 is a view showing the aspherical state.

FIG. 6 shows in a cross-sectional view another embodiment of the lens system of the present invention, of which aberrations are represented in FIGS. 7A, 7B and 7C respectively at the shortest, medium and longest focal lengths. In the lens system shown in FIG. 6, the focusing lens group is composed of the 1st to 5th lens faces, the variable-magnification lens group is composed of the 6th to 12th lens faces, the diaphragm is constituted by the 13th face, and the relay lens group is composed of the 14th to 24th lens faces. The 12th, 14th and 20th faces are composed of aspherical faces as shown in FIG. 6, which are determined by the following equation:

$$x = \gamma\left(1 - \left(1 - \frac{h^2}{\gamma^2}\right)^{\frac{1}{2}}\right) + Eh^{10}$$

between the height h from the axis and the aspherical deviation x, wherein the constants $\gamma$ and E are given for each face in the following table:

| Face | $\gamma$ | E |
|---|---|---|
| 12 | −69.154 | $3.63 \times 10^{-12}$ |
| 14 | −14.997 | $-4.00 \times 10^{-12}$ |

-continued

| Face | $\gamma$ | E |
|---|---|---|
| 20 | 88.857 | $6.03 \times 10^{-14}$ |

The 14th face is in fact an aspherical thin layer, formed for example by vacuum evaporation, on the 15th face of a concave-concave lens, and has a zero thickness on the optical axis. The parameters of the lens system shown in FIG. 6 are summarized in Table 2, wherein the symbols have the same meanings as explained in relation to Table 1.

TABLE 2

| Face | R | D | V | N |
|---|---|---|---|---|
| 1 | 103.69299 | 2.00 | 25.40 | 1.80510 |
| 2 | 36.80299 | 7.44 | 61.10 | 1.58910 |
| 3 | −90.86301 | 0.12 | | 1. |
| 4 | 27.11501 | 4.40 | 61.10 | 1.58910 |
| 5 | 96.97200 | $l_1$ | | 1. |
| 6 | −921.15894 | 0.90 | 58.20 | 1.62290 |
| 7 | 11.49700 | 3.38 | | 1. |
| 8 | −18.12801 | 0.90 | 64.10 | 1.51630 |
| 9 | 15.29100 | 2.63 | 25.40 | 1.80510 |
| 10 | 76.14600 | $l_2$ | | 1. |
| 11 | 34.96300 | 2.56 | 61.10 | 1.58910 |
| 12 | −69.15401 | $l_3$ | | 1. |
| 13 | 0.00000 | 4.44 | | 1. |
| 14 | −14.99700 | 0.00 | 65.50 | 1.48500 |
| 15 | −14.99700 | 1.20 | 54.70 | 1.72916 |
| 16 | 49.10500 | 2.00 | 27.50 | 1.75520 |
| 17 | −63.24300 | 9.20 | | 1. |
| 18 | −163.48000 | 3.50 | 60.70 | 1.60311 |
| 19 | −23.86600 | 0.20 | | 1. |
| 20 | −88.85699 | 1.20 | 23.90 | 1.84666 |
| 21 | 21.63000 | 5.70 | 62.80 | 1.61700 |
| 22 | −52.82800 | 0.20 | | 1. |
| 23 | 24.09500 | 3.00 | 63.10 | 1.56873 |
| 24 | 160.73000 | 2.00 | | 1. |
| 25 | 0.00000 | 32.00 | 43.10 | 1.69471 |
| 26 | 0.00000 | 1.00 | | 1. |
| 27 | 0.00000 | 6.60 | 64.10 | 1.51633 |
| 28 | 0.00000 | 5.67 | | 1. |
| Focal length | 13.937 | 23.856 | | 39.716 |
| $l_1$ | 1.7910 | 10.6970 | | 15.5990 |
| $l_2$ | 15.0560 | 9.9200 | | 1.2490 |
| $l_3$ | 10.9252 | 7.4000 | | 10.9252 |

The exit pupil is located at 1.2 km at the image field side from the rear principal plane of the lens group composed of the 18th to 24th faces.

What I claim is:

1. A lens system having a color separation optical system, comprising in the order from the object field side:

a first lens group having focusing means and variable magnification lens means;

a diaphragm for limiting a light beam from said first lens group;

a second lens group being constantly placed at a fixed position, and forming the exit pupil at a substantially infinite distance position from the image plane of said lens system; and a color separation optical system disposed between said second lens group and the image plane, said diaphragm and said second lens group further being arranged to cause the principal rays of the light beam emerging from said second lens group to enter said color separation optical system in parallel.

2. A lens having a color separation optical system according to the claim 1, wherein said second lens group is composed of a front lens group having a negative refractive power and a rear lens group having a positive refractive power which are arranged in this order in the image field side and each of which is provided with at least one combined lens composed of a concave lens and a convex lens.

3. A lens having a color separation optical system according to the claim 1, wherein said focusing means comprises a focusing lens group movable for focusing and wherein said variable magnification lens means comprises a zooming lens group movable for zooming, said focusing lens group and said zooming lens group being arranged in this order from the object field side.

4. A zoom lens having a color separation optical system, comprising:

a first lens group including focusing means and zooming means in order from the object field side;

a diaphragm for limiting a light beam from said first lens group;

a second lens group for receiving the light beam from said diaphragm and for making the principal rays of the light beam emerging therefrom parallel to the optical axis of the lens; and a color separation optical system disposed between said second lens group and the image plane of said zooming means, said diaphragm and said second lens group further being arranged to cause the principal rays of the light beam emerging from said second lens group to enter said color separation optical system in parallel.

* * * * *